(12) United States Patent
McCall (10) Patent No.: US 10,888,174 B2
(45) Date of Patent: Jan. 12, 2021

(54) MOSQUITO BED NET ASSEMBLY

(71) Applicant: LIVERPOOL SCHOOL OF TROPICAL MEDICINE, Liverpool (GB)

(72) Inventor: Philip John McCall, Liverpool (GB)

(73) Assignee: LIVERPOOL SCHOOL OF TROPICAL MEDICINE, Liverpool (GB)

( * ) Notice: Subject to any disclaimer, the term of this patent is extended or adjusted under 35 U.S.C. 154(b) by 429 days.

(21) Appl. No.: 15/033,338

(22) PCT Filed: Oct. 23, 2014

(86) PCT No.: PCT/GB2014/053154
§ 371 (c)(1),
(2) Date: Apr. 29, 2016

(87) PCT Pub. No.: WO2015/063455
PCT Pub. Date: May 7, 2015

(65) Prior Publication Data
US 2016/0262553 A1 Sep. 15, 2016

(30) Foreign Application Priority Data
Nov. 1, 2013 (GB) .................................. 1319336.2

(51) Int. Cl.
*A01M 1/20* (2006.01)
*A01M 29/34* (2011.01)
(Continued)

(52) U.S. Cl.
CPC ............. *A47C 29/006* (2013.01); *A01M 1/20* (2013.01); *A01M 29/34* (2013.01); *A01N 25/34* (2013.01);
(Continued)

(58) Field of Classification Search
CPC ........ A01M 1/20; A01M 1/2016; A01M 1/00; A01M 29/34
(Continued)

(56) References Cited

U.S. PATENT DOCUMENTS 87,589 A * 3/1869 Platt ..................... A47C 29/003
5/414
415,913 A * 11/1889 Kip ......................... E04H 15/04
135/90
(Continued)

FOREIGN PATENT DOCUMENTS

CN 201709886 U 1/2011
EP 382382 A1 * 8/1990
(Continued)

OTHER PUBLICATIONS

Translation of CN 201709886 (Year: 2011).*
(Continued)

*Primary Examiner* — Darren W Ark
(74) *Attorney, Agent, or Firm* — Barnes & Thornburg LLP (57) ABSTRACT

Mosquito bed net assembly 10*a-h* includes a mosquito bed net (12) impregnated with a first insecticide and a barrier member 16*a-h* located above an upper surface (14) of the bed net (12) and being impregnated with a second insecticide. In use, bed net assembly 16*a-h* increases the likelihood of delivering a lethal dosage of insecticide to mosquitoes flying in frequently-visited areas of a bed net, without increased attendant health risk to a user.

18 Claims, 12 Drawing Sheets

(51) Int. Cl.
*A47C 29/00* (2006.01)
*A01N 25/34* (2006.01)
*A45F 3/52* (2006.01)
*A01N 43/30* (2006.01)

(52) U.S. Cl.
CPC ............... *A01N 43/30* (2013.01); *A45F 3/52* (2013.01); *A01M 2200/012* (2013.01); *Y02A 50/30* (2018.01)

(58) Field of Classification Search
USPC ............................ 43/132.1, 131; 5/414–416
See application file for complete search history.

(56) References Cited

U.S. PATENT DOCUMENTS

| | | | | |
|---|---|---|---|---|
| 435,191 | A * | 8/1890 | Sarrazin | A47C 29/003 5/414 |
| 467,163 | A * | 1/1892 | Eva | A47C 29/006 5/415 |
| 671,912 | A * | 4/1901 | Woodward | A47C 29/006 135/90 |
| 1,342,354 | A * | 6/1920 | Schoonmaker | A47C 29/006 135/90 |
| 1,687,862 | A * | 10/1928 | De Sena Y Freixas | A47C 29/006 135/90 |
| 2,301,511 | A * | 11/1942 | Boyce | A47C 29/006 5/113 |
| 4,905,406 | A * | 3/1990 | Warner | A01M 1/02 119/654 |
| 5,198,287 | A * | 3/1993 | Samson | A01N 25/34 135/115 |
| 5,252,387 | A * | 10/1993 | Samson | A01N 25/34 135/115 |
| 5,503,918 | A * | 4/1996 | Samson | D06M 15/09 135/115 |
| 6,145,141 | A * | 11/2000 | Whittington | A47C 29/006 135/116 |
| 6,263,894 | B1 * | 7/2001 | LaMantia | A47C 29/006 135/117 |
| 6,715,168 | B2 * | 4/2004 | Williams | A47C 29/006 135/96 |
| 7,243,375 | B2 * | 7/2007 | Seo | A41D 13/001 2/4 |
| 7,793,920 | B2 * | 9/2010 | Bauer | A01M 1/04 256/5 |
| 8,061,377 | B2 * | 11/2011 | Vestergaard Frandsen | A47C 29/006 135/115 |
| 8,087,110 | B1 * | 1/2012 | Park | A47C 29/006 135/96 |
| 8,215,051 | B2 * | 7/2012 | Alexander | A01G 13/0281 43/132.1 |
| 8,256,044 | B1 * | 9/2012 | Park | A47C 29/006 135/117 |
| 9,066,600 | B1 * | 6/2015 | Ramrattan | A47C 29/006 |
| 9,288,978 | B2 * | 3/2016 | Karl | A01N 25/34 |
| 9,485,990 | B2 * | 11/2016 | Sonneck | A01N 25/10 |
| 9,907,300 | B1 * | 3/2018 | Dornback | A01M 1/106 |
| 2005/0019364 | A1 * | 1/2005 | Frandsen | A01N 25/34 424/411 |
| 2006/0009101 | A1 * | 1/2006 | Chou | A01M 29/12 442/59 |
| 2007/0122437 | A1 * | 5/2007 | Hougard | A01N 37/18 424/405 |
| 2008/0070020 | A1 * | 3/2008 | Black | A01M 29/12 428/219 |
| 2008/0072944 | A1 * | 3/2008 | Wu | A45F 3/22 135/90 |
| 2009/0246242 | A1 * | 10/2009 | Leininger | A01F 25/14 424/411 |
| 2010/0064578 | A1 * | 3/2010 | Karl | A01G 13/10 47/31 |
| 2010/0132245 | A1 * | 6/2010 | Vestergaard Frandsen | A01M 29/34 43/132.1 |
| 2010/0263306 | A1 * | 10/2010 | Vestergaard Frandsen | A01N 25/34 52/173.1 |
| 2012/0034285 | A1 * | 2/2012 | Vestergaard Frandsen | A01N 43/30 424/403 |
| 2012/0114726 | A1 * | 5/2012 | Leininger | A01N 25/10 424/411 |
| 2012/0114727 | A1 * | 5/2012 | Leininger | A01N 43/36 424/411 |
| 2012/0141756 | A1 * | 6/2012 | Ramaioli | A41D 13/001 428/213 |
| 2014/0041285 | A1 * | 2/2014 | Russell | A01K 13/006 43/132.1 |
| 2015/0093427 | A1 * | 4/2015 | Vestergaard Frandsen | A01N 53/00 424/411 |
| 2017/0224137 | A1 * | 8/2017 | Hartdorn | A47G 9/00 |
| 2020/0115957 | A1 * | 4/2020 | Papadopoulos | A01M 29/34 |

FOREIGN PATENT DOCUMENTS

| | | | | |
|---|---|---|---|---|
| EP | 1183947 | A2 * | 3/2002 | A01K 1/0353 |
| EP | 2859794 | B1 * | 12/2016 | A01M 1/2016 |
| GB | 110456 | A * | 10/1917 | E04H 15/00 |
| WO | WO-9818998 | A1 * | 5/1998 | A01N 53/00 |
| WO | WO-0137662 | A1 * | 5/2001 | A01N 25/24 |
| WO | WO-03003827 | A1 * | 1/2003 | A01M 1/04 |
| WO | WO-03034823 | A1 * | 5/2003 | A01N 25/10 |
| WO | WO-03090532 | A1 * | 11/2003 | A01N 25/34 |
| WO | WO-2009059603 | A1 * | 5/2009 | A01N 25/34 |
| WO | WO-2010046348 | A1 * | 4/2010 | |
| WO | WO-2010115709 | A1 * | 10/2010 | |
| WO | WO-2010118743 | A1 * | 10/2010 | A01N 43/30 |
| WO | WO-2012102344 | A1 * | 8/2012 | A01N 25/34 |
| WO | 2015052008 | A1 | 4/2015 | |
| WO | WO-2015052008 | A1 * | 4/2015 | |
| WO | WO-2016016906 | A2 * | 2/2016 | |
| WO | WO-2016036262 | A1 * | 3/2016 | |

OTHER PUBLICATIONS

CN 201709886 U (Year: 2011).*
Guillet et al., "Combined pyrethroid and carbamate 'two-in-one' treated mosquito nets: Field efficacy against prethroid-resistant Anopheles gambiae and Culex quinquefasciatus", Medical and Veterinary Entomology (2001) 15, 105-112.
PCT Search Report and Written Opinion for PCT/EP2014/068662, completed Nov. 14, 2014.
United Kingdom Search Report for GB1319336.2, completed Mar. 31, 2014.

* cited by examiner

MOSQUITO BED NET ASSEMBLY

CROSS-REFERENCE TO RELATED APPLICATIONS

This application is the U.S. national phase of PCT/GB2014/053154, filed on Oct. 23, 2014, which claims priority to United Kingdom Patent Application No. 1319336.2, filed on Nov. 1, 2013. The disclosures of both United Kingdom Patent Application No. 1319336.2 and PCT Application No. PCT/GB2014/053154 are hereby incorporated herein by reference in their entireties.

The present invention relates to a mosquito bed net assembly. More specifically, the invention relates to a mosquito bed net assembly in which the bed net is a box net.

BACKGROUND OF THE INVENTION

Insecticide treated bed nets (ITNs) are one of the most effective tools available for the prevention of malaria. Not only have ITNs proved successful in protecting those who sleep directly underneath them, but widespread use of ITNs has been shown to reduce infection rates in the wider community, including those sleeping without nets.

The current generation of bed nets, termed long-lasting insecticidal nets (LLINs), remain central to malaria control and elimination in Africa where indoor transmission of malaria is of major significance. However, resistance to pyrethroids, currently the only class of insecticides approved for use on LLINs, is emerging at an alarming rate in *Anopheles gambiae* sensu stricto, the main indoor-biting vector of malaria in Africa, and the species most effectively targeted by LLINs. Accordingly, this resistance to currently-employed bed net insecticides represents a considerable threat for future malaria control. If, therefore, LLINs are to remain central to malaria prevention, new designs or approaches are urgently needed.

The present invention was devised with the foregoing in mind.

SUMMARY OF THE INVENTION

According to a first aspect of the present invention there is provided a mosquito bed net assembly comprising a mosquito bed net and a barrier member disposed above an upper portion of the bed net, wherein the bed net comprises a first insecticide and the barrier member comprises a second insecticide. The inventor has surprisingly found that for human-baited bed nets (i.e. those bed nets having a prone human beneath) the upper portion of the net, particularly the area directly above a prone human, is the area most visited by mosquitoes intent on feeding. At least one rationale for such a concentration of mosquito activity is the combined effect of bodily stimuli, such as heat and odour, emanating from the human below, which are channelled by the walls of the bed net to a focal point on its upper surface. For LLINs treated with approved pyrethroids, feeding mosquitoes have been demonstrated to adopt oscillating flight paths in the region above the bed net, whether or not they eventually make contact with the treated surface. Other studies have shown that those mosquitoes that do make contact with the upper treated surface of the bed net often go on to make further contacts therewith in a bouncing or hopping manner. The barrier member forming part of the present bed net assembly markedly increases the likelihood of such oscillating and bouncing mosquitoes coming into more frequent contact with an insecticide-treated surface. Additionally, the barrier member forming part of the present invention is located above, and therefore outside, the treated bed net meaning that it is unlikely, if not impossible, for it to come into contact with a human sleeping thereunder. As a consequence, insecticidal alternatives to pyrethroids may be applied to the barrier member, thereby increasing the likelihood of killing mosquitoes that have developed some resistance to pyrethroids. Suitably, the bed net is impregnated with the first insecticide and the barrier member is impregnated with the second insecticide.

In an embodiment, the first and second insecticides are the same. In view of the observed mosquito flying characteristics, the bed net assembly of the present invention is configured so as to increase the frequency of mosquito-bed net collisions, thereby increasing the likelihood of delivering a fatal dose of a single insecticide. The single insecticide may be any insecticide currently, or eventually, approved by the World Health Organisation Pesticide Evaluation Scheme (WHOPES) for use with LLINs.

Suitably, the first and second insecticides are different.

In an embodiment, the first insecticide comprises at least one pyrethroid insecticide. At present, pyrethroids are the only class of insecticides approved by the World Health Organisation Pesticide Evaluation Scheme (WHOPES) for use with LLINs.

In another embodiment, the second insecticide comprises at least one non-pyrethroid insecticide. The barrier member forming part of the present invention is located above the bed net, such that it is sufficiently distant from a human sleeping thereunder. As a consequence, the barrier member may be impregnated with other, preferably more effective non-pyrethroid insecticides, whose use on standard LLINs would otherwise be barred under the regulations imposed by WHOPES. Optionally, the second insecticide may comprise at least one pyrethroid insecticide in combination with at least one non-pyrethroid insecticide.

Suitably, the upper portion is defined by an upper surface of the net bed.

In an embodiment, the barrier member is formed from netted, meshed or webbed fabric. For the sake of cost and ease of manufacturing, the barrier member may be made from the same material as the bed net itself. Alternatively, the barrier member may be made from a more, or less, porous material, which may be partially or wholly stiffened depending on the specific form of the barrier member, and the availability of any overhead suspending means. In an embodiment, the bed net assembly is made from polyester.

In another embodiment, at least a portion of the barrier member is attached to the upper surface of the bed net. The barrier member forming part of the present invention may therefore be integrally formed with the bed net. Suitably, the barrier member is attached to the upper surface by stitching, gluing or any other known attachment means.

In a further embodiment, at least a portion of the barrier member is suspendable from above the upper surface of the bed net. Depending on the location in which the bed net assembly is to be used, the barrier member, or at least part of it, may be configured so as to be suspendable from above, such as from a ceiling or other overhead object, such that the barrier member is not itself in contact, or in intimate contact, with the bed net. Alternatively, the barrier member may be formed integrally with the bed net, whilst at the same time being configured so as to be suspendable, or partially suspendable, from above.

Suitably, the barrier member extends substantially perpendicularly to the upper surface of the bed net. The barrier member forming part of the present invention may be configured so as to project upwardly from the plane defined by the bed net's upper surface. Such a configuration is particularly effective at intercepting such oscillating and low-flying mosquitoes, and delivering to them a fatal dose of an insecticide.

In an embodiment, the barrier member comprises a first upstanding planar sheet. The barrier member may be a simple rectangular sheet whose bottom edge is associated with the upper surface of the bed net.

In another embodiment, the first planar sheet extends longitudinally along at least a portion of the length of the bed net. The barrier member may extend along the length of the bed net. Suitably, the longitudinally-extending barrier member is disposed at a substantially medium point along the width of the upper surface of the bed net. More suitably, the first planar sheet extends along the entire length of the bed net.

In another embodiment, the first planar sheet extends laterally along at least a portion of the width of the bed net. The barrier member may extend along the width of the bed net. Suitably, the laterally-extending barrier member is disposed at a substantially medium point along the length of the upper surface of the bed net. More suitably, the first planar sheet extends along the entire width of the bed net. Optionally, the laterally-extending barrier member is disposed approximately one third along the length of the upper surface of the bed net, such that it lies substantially over the chest area of a sleeping human.

In a further embodiment, the barrier member further comprises a second upstanding planar sheet, wherein the second planar sheet intersects and is perpendicular to the first planar sheet. The barrier member may therefore be formed from intersecting lateral and longitudinal planar sheets, thereby presenting further surfaces for contact with hostseeking mosquitoes.

In a further embodiment, the barrier member is conical, frustoconical or cylindrical. Suitably, the barrier member is centrally located on the upper surface of the bed net. Optionally, the barrier member is disposed approximately one third along the length of the upper surface of the bed net, such that it lies substantially over the chest area of a sleeping human. The base of the conical, frustoconical or cylindrical barrier member may define an opening in the upper surface of the bed net, thereby increasing the surface area of the upper surface at the point where bodily stimuli are believed to be most concentrated. Alternatively, where the upper surface of the bed net is unbroken, the conical, frustoconical or cylindrical barrier member may comprise one or more mosquito opening, thereby increasing the likelihood of mosquitoes becoming trapped within the barrier member where they can receive a lethal dose of insecticide. Optionally, the one or more openings define an opening to an internal passage provided within the barrier member. Optionally the internal passage is tapered towards the upper surface. Optionally, only an inner surface of the barrier member comprises the non-pyrethroid insecticide.

In another embodiment, the barrier member is disposed substantially co-planar to the upper surface of the bed net. Such a configuration is particularly effective at intercepting oscillating and low-flying mosquitoes, and delivering to them a fatal dose of an insecticide.

Suitably, the barrier member extends across substantially the same area as the upper surface of the bed net. Accordingly, the barrier member may be of substantially identical dimensions to the upper surface of the bed net, such that it may be viewed as a second upper surface. More suitably, the barrier member may be spaced above the upper surface of the bed net by supporting means disposed at its corners.

More suitably, the barrier member further comprises a mosquito opening, permitting mosquito access to the space beneath the barrier member. Incoming mosquitoes pass through the barrier member's opening and contact the upper surface of the bed net. Those which go on to exhibit low-flying characteristics become sandwiched between the bed net's upper surface and the co-planar barrier member, thereby restricting the mosquitoes' freedom of movement and hence increasing the likelihood of receiving a fatal dose of insecticide. The opening may be centrally-located on the upper surface, or in another region where bodily stimuli are believed to be at their most concentrated.

In an embodiment, the co-planar barrier member is disposed above the upper surface at a distance of between 0.5 and 10 cm. The narrow gap between the bed net's upper surface and the barrier member increases the likelihood of delivering a fatal dose of insecticide. Suitably, the edges of the barrier member do not form a closed structure with the respective side walls of the bed net. Accordingly, the upper surface of the bed net is accessible to a user to enable dead mosquitoes to be easily removed by sweeping, blowing or vacuuming.

In another embodiment, the co-planar barrier member has a top surface and a bottom surface. Suitably, both the top and bottom surfaces are impregnated with the second insecticide. More suitably, only the bottom surface is so impregnated. Such a configuration reduces the risk of human contact with the insecticide.

In yet another embodiment, the barrier member further comprises stiffening means. Stiffening means may be used in order that the barrier member retains its structure and orientation in use. The stiffening means may be disposed around the edges of the barrier member, as a frame. Alternatively, the stiffening means may be located at regular, or irregular, intervals along the length or width of the barrier member. Suitable stiffening means include ribs, rigid strips, wire frames, wire mesh or support posts.

In a further embodiment, the first insecticide comprises at least one insecticide selected from the group consisting of allethrin, bifenthrin, cyfluthrin, cypermethrin, cyphenothrin, deltamethrin, esfenvalerate, etofenprox, fenpropathrin, fenvalerate, flucythrinate, flumethrin, imiprothrin, lambda-cyhalothrin, methofluthrin, permethrin, prallethrin, resmethrin, silafluofen, sumithrin, tau-fluvalinate, tefluthrin, tetramethrin, tralomethrin, transfluthrin and pyriproxyfen. At present, pyrethroids are the only class of insecticides approved by the World Health Organisation Pesticide Evaluation Scheme (WHOPES) for use with LLINs, although other, non-pyrethroid insecticides are currently being tested for their suitability.

In another embodiment, the second insecticide comprises at least one insecticide selected from the group consisting of organophosphates, carbamates, pyrroles, hormone mimics and biological insecticides. In use, the barrier member comprising the second insecticide is sufficiently distant from the user such that more potent, non-pyrethroid insecticides can be used. Suitably, the second insecticide comprises at least one insecticide selected from the group consisting of pirimiphos methyl, propoxur, bendiocarb, indoxycarb, chlorphenapyr, pyriproxyfen, methoprene, *Bacillus thuringiensis israelensis* and entomopathogenic fungi.

In still another embodiment, the first insecticide further comprises a synergist. When the bed net assembly of the present invention is to be used in those areas where mosquitoes have developed, or are developing, resistance to pyrethroid-type insecticides, a synergist may be used in combination with the first insecticide in order to restore its efficacy. Suitably, the synergist is piperonyl butoxide.

In a further embodiment, the bed net is a box net. Box nets are among the most common types of mosquito bed net is use and generally take the form of a rectangular box. The flat, upper surface of the box net provides an ideal site on which to locate the barrier member forming part of the present invention.

According to a second aspect of the present invention, there is provided a kit comprising:
a. a mosquito bed net, and
b. a barrier member disposed above an upper portion of the bed net, wherein the bed net comprises a first insecticide and the barrier member comprises a second insecticide.

According to a third aspect of the present invention, there is provided a barrier member as herein defined, the barrier member being configured to be associated with an upper portion of a mosquito bed net.

It will be appreciated that the barrier member may be identical in form any of the barrier members forming part of any of the mosquito bed net assemblies described herein. It will also be appreciated that the barrier member may comprise any insecticide discussed hereinbefore in respect of the barrier members forming part of the mosquito bed net assemblies.

In one embodiment, the barrier member is configured to be attached to an upper portion of a mosquito bed net.

DETAILED DESCRIPTION OF THE INVENTION

One or more embodiments of the invention will now be described, by way of example only, with reference to the accompanying figures, in which.

A mosquito bed net assembly 10a-h includes a mosquito bed "box net" 12 impregnated with a pyrethroid insecticide and having a top surface 14, and a barrier member 16a-h impregnated with a non-pyrethroid insecticide and disposed above top surface 14.

Figure 1:
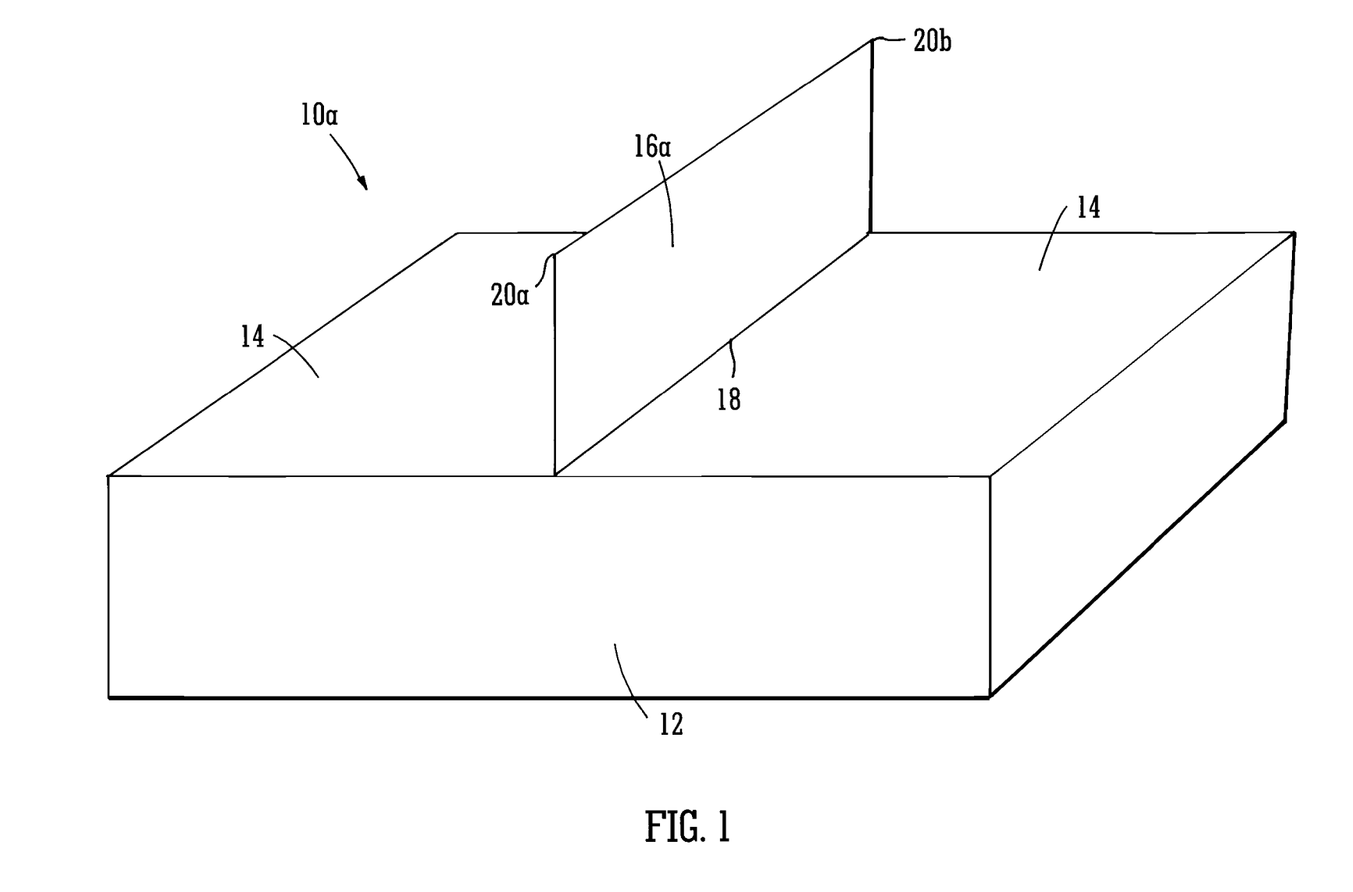
FIG. 1 is a view from the front, one side, and above of one embodiment of the present invention.

Referring to FIG. 1, barrier member 16a is formed from a rectangular planar sheet of netted material, attached to top surface 14 via its lower edge 18 and extending upwardly in a direction perpendicular to top surface 14. Barrier member 16a is located at a middle point along the length of top surface 14, and extends across its entire width. Barrier member 16a is attachable at uppermost corners 20a,b to a ceiling or other overhead object.

Figure 2:
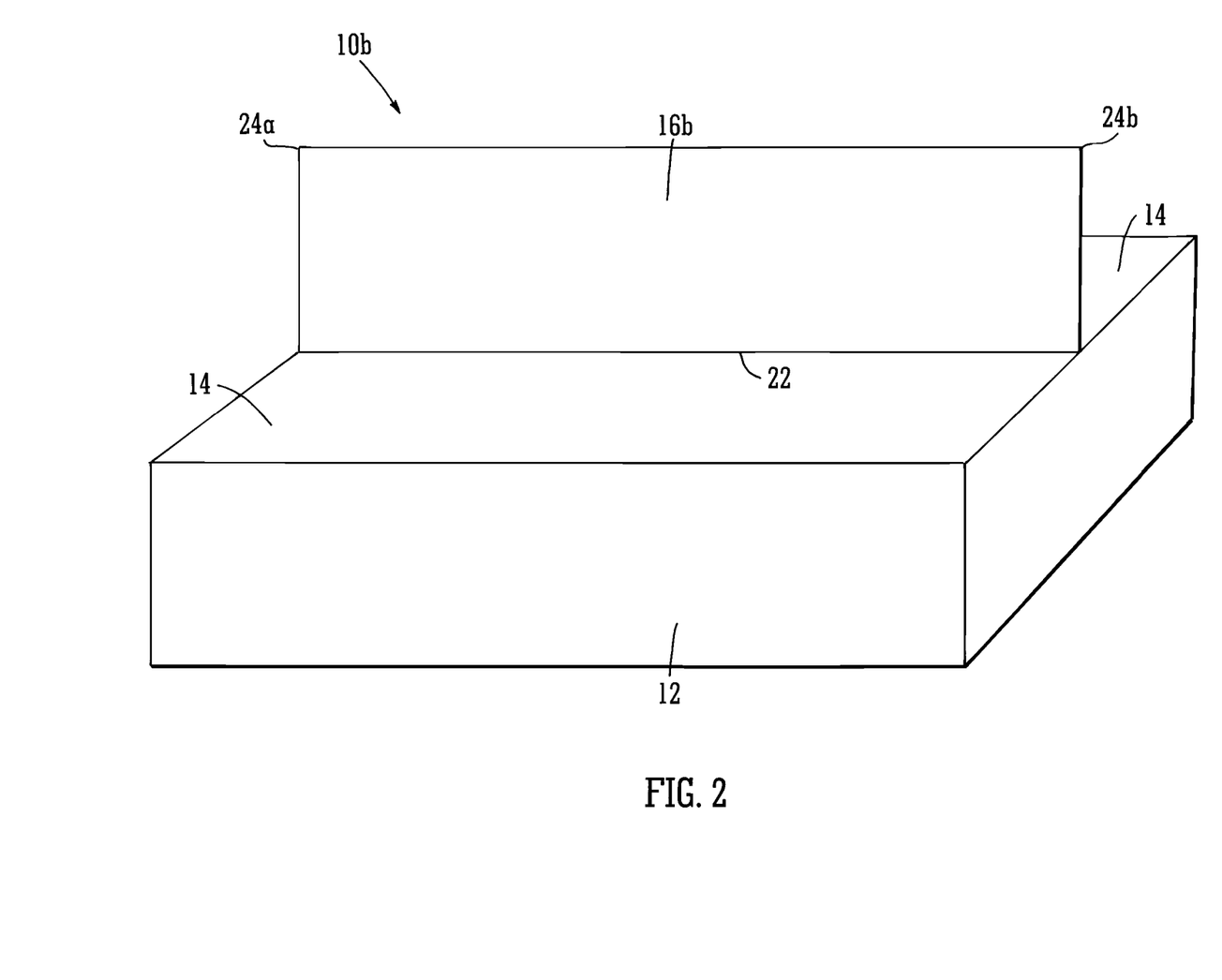
FIG. 2 is a view from the front, one side, and above of another embodiment of the present invention.

Referring to FIG. 2, barrier member 16b is formed from a rectangular planar sheet of netted material, attached to top surface 14 via its lower edge 22 and extending upwardly in a direction perpendicular to top surface 14. Barrier member 16b is located at a middle point along the width of top surface 14, and extends across its entire length. Barrier member 16b is attachable at uppermost corners 24a,b to a ceiling or an overhead object.

Figure 3:
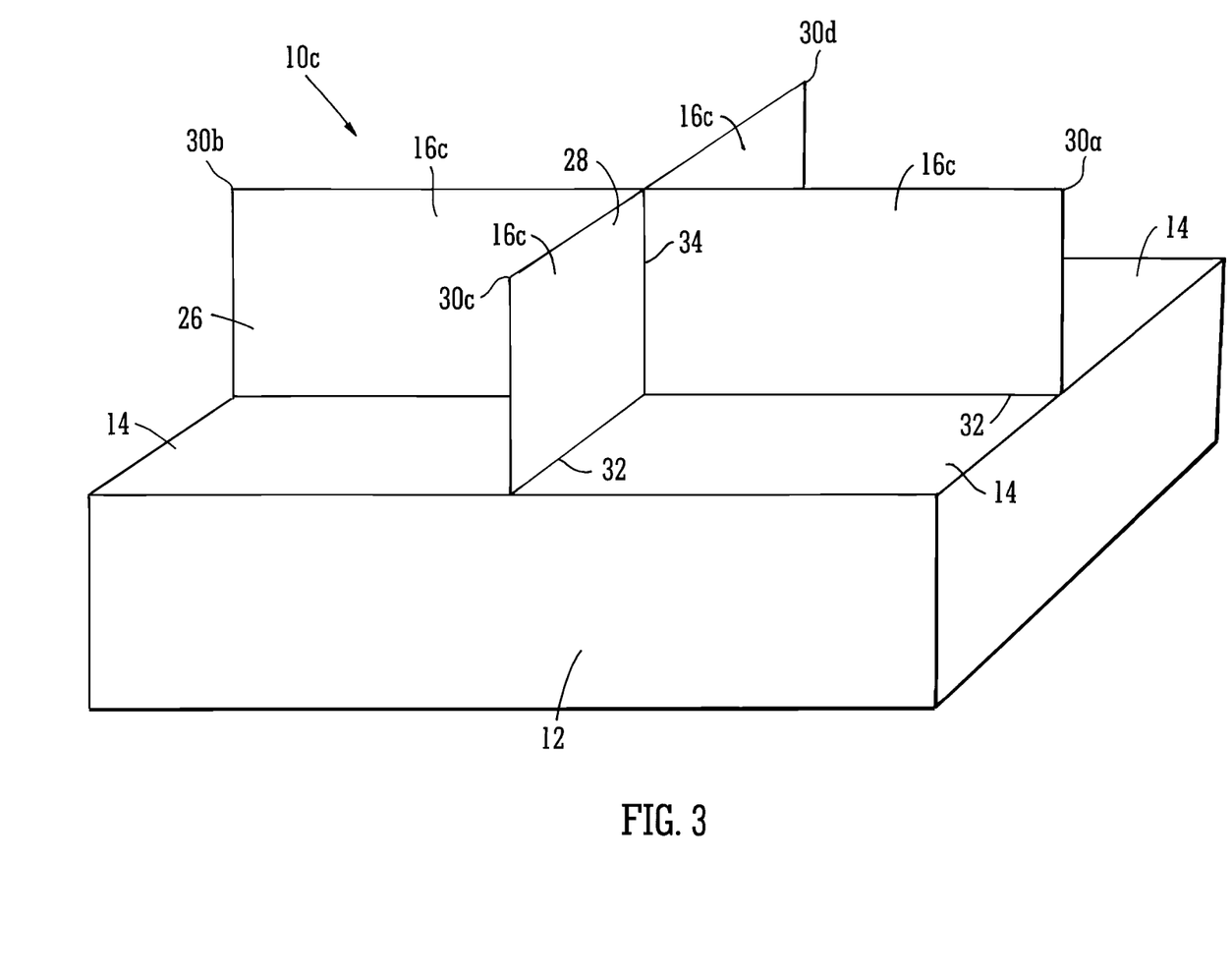
FIG. 3 is a view from the front, one side, and above of another embodiment of the present invention.

Referring to FIG. 3, barrier member 16c is formed from first and second rectangular planar sheets 26, 28 of netted material, attached to top surface 14 via their lower edge 32 and extending upwardly in a direction perpendicular to top surface 14. First planar sheet 26 is located at a middle point along the width of top surface 14, and extends across its entire length. Second planar sheet 28 is located at a middle point along the length of top surface 14, and extends across its entire width, such that first and second planar sheets 26, 28 are arranged perpendicular to one another and intersect one another at a middle point 34 along their lengths. Barrier member 16c is attachable at uppermost corners 30a-d to a ceiling or other overhead object.

Figure 4:
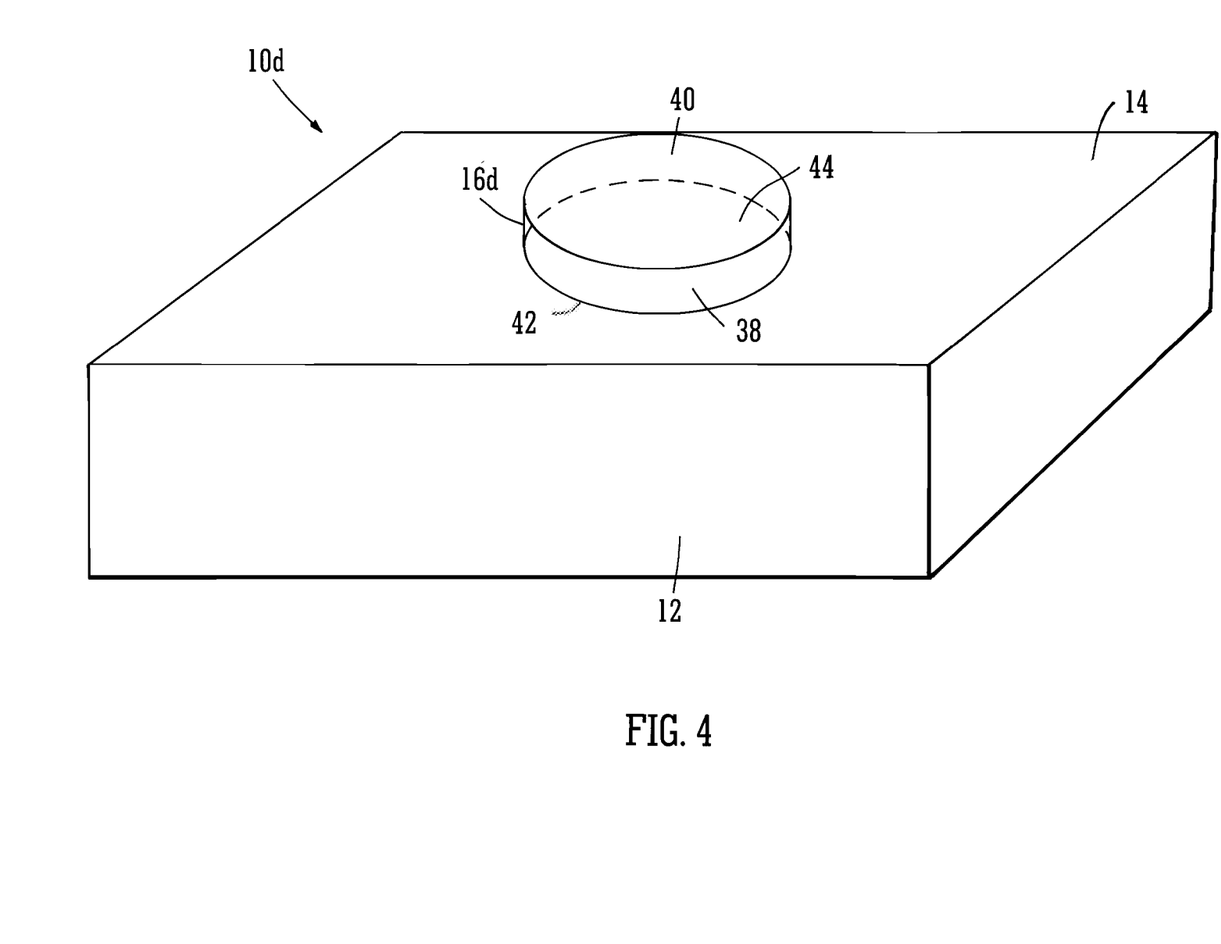
FIG. 4 is a view from the front, one side, and above of another embodiment of the present invention.

Referring to FIG. 4, cylindrical barrier member 16d is formed from stiffened netted material and includes a cylindrical outer wall 38, extending upwardly from upper surface 14, and a top wall 40 lying in the same plane as upper surface 14. Barrier member 16d is centrally located on upper surface 14 and is attached thereto via its lower edge 42. Barrier member 16d is open at its bottom face, defining an opening 44 in the upper surface 14.

Figure 5:
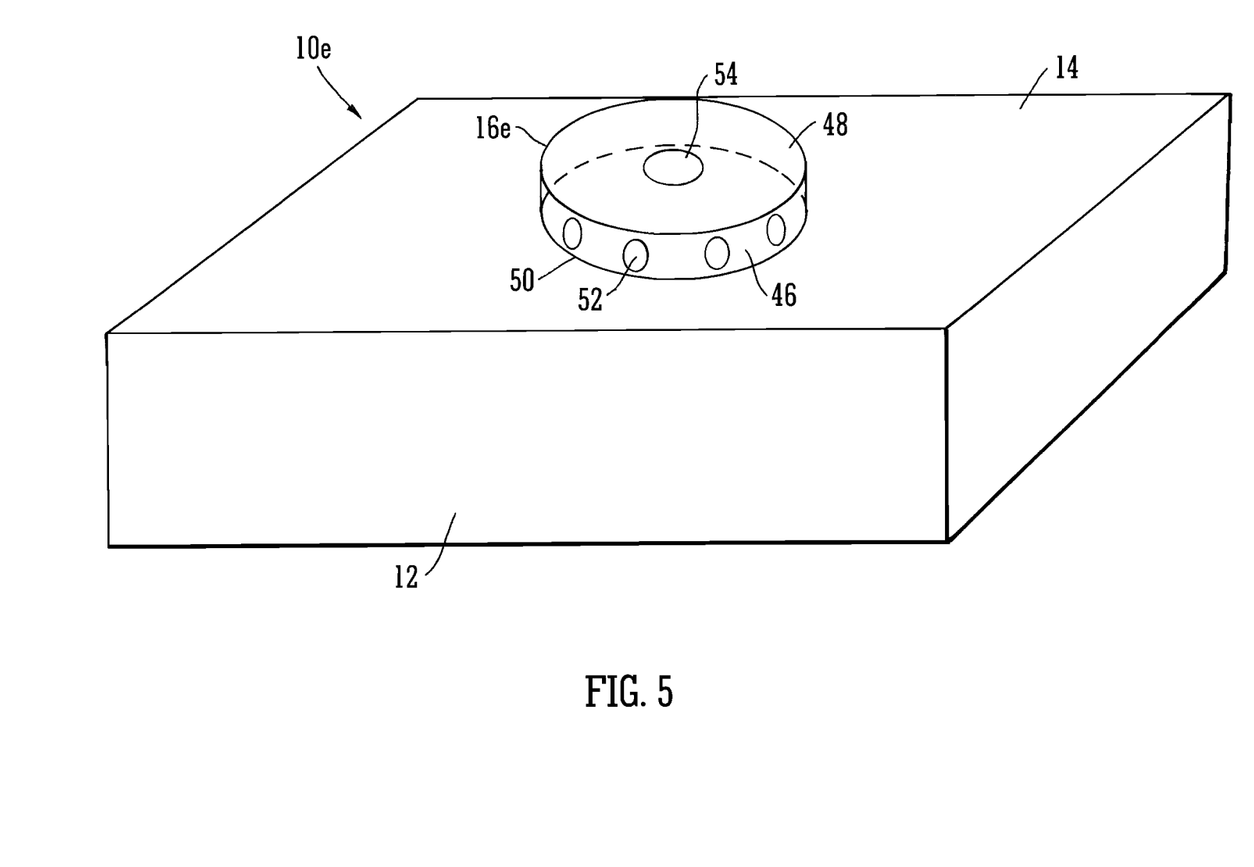
FIG. 5 is a view from the front, one side, and above of another embodiment of the present invention.

Referring to FIG. 5, cylindrical barrier member 16e is formed from stiffened netted material having a cylindrical outer wall 46 extending upwardly from upper surface 14, a top wall 48 lying in the same plane as upper surface 14, and a bottom wall defined by upper surface 14. Barrier member 16e is centrally located on upper surface 14 and is attached thereto via its lower edge 50. Only the innermost surfaces of outer wall 46 and top wall 48 are impregnated with the non-pyrethroid insecticide. A plurality of openings 52 are disposed at regular intervals around cylindrical outer wall 46. Top wall 48 also includes a centrally-disposed opening 54. Openings 52, 54 act as entrance points for mosquitoes.

Figure 6:
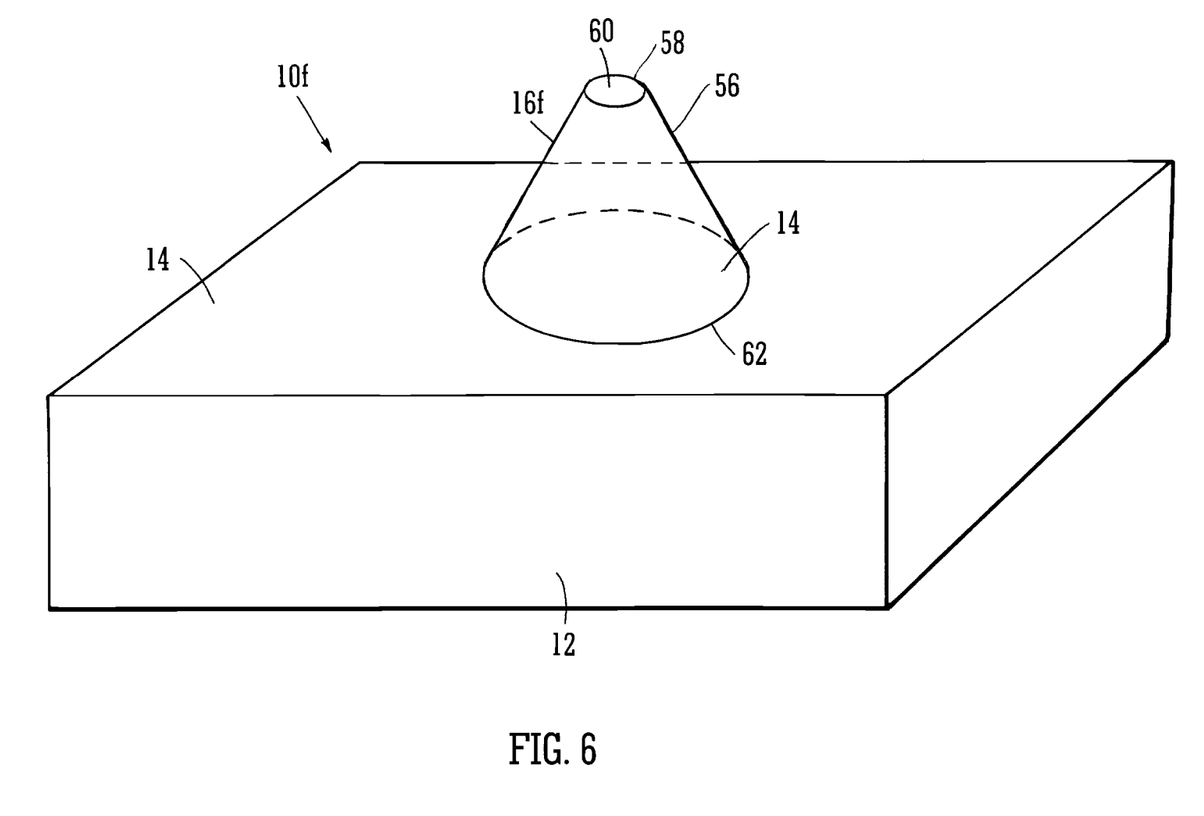
FIG. 6 is a view from the front, one side, and above of another embodiment of the present invention.

Referring to FIG. 6, frustoconical barrier member 16f is formed from stiffened netted material having a conical outer wall 56 extending generally upwardly from upper surface 14, a bottom wall defined by upper surface 14, and an upper edge 58 defining an opening 60 Barrier member 16f is centrally located on upper surface 14 and is attached thereto by its lower edge 62. Only the innermost surface of outer wall 56 is impregnated with the non-pyrethroid insecticide. Opening 60 acts as an entrance point for mosquitoes.

Figure 7:
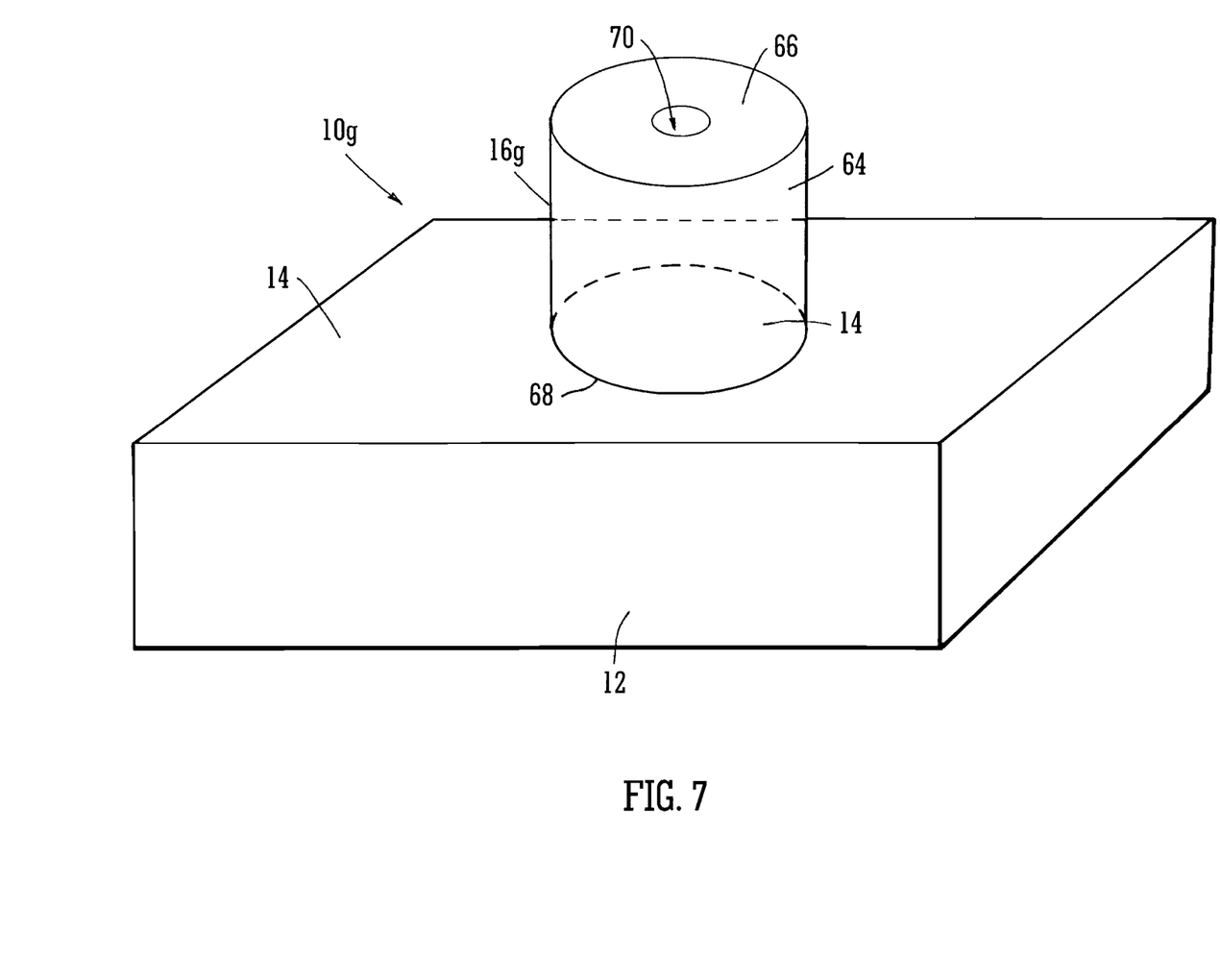
FIG. 7 is a view from the front, one side, and above of another embodiment of the present invention.

Referring to FIG. 7, cylindrical barrier member 16g is formed from stiffened netted material having a cylindrical outer wall 64 extending upwardly from upper surface 14, a top wall 66 lying in the same plane as upper surface 14, and a bottom wall defined by upper surface 14. Barrier member 16g is centrally located on upper surface 14 and is attached thereto by its lower edge 68. Only the innermost surfaces of outer wall 64 and top wall 66 are impregnated with the non-pyrethroid insecticide. Top wall 66 includes a centrally disposed opening 70, acting as an entrance point for mosquitoes.

Figure 8:
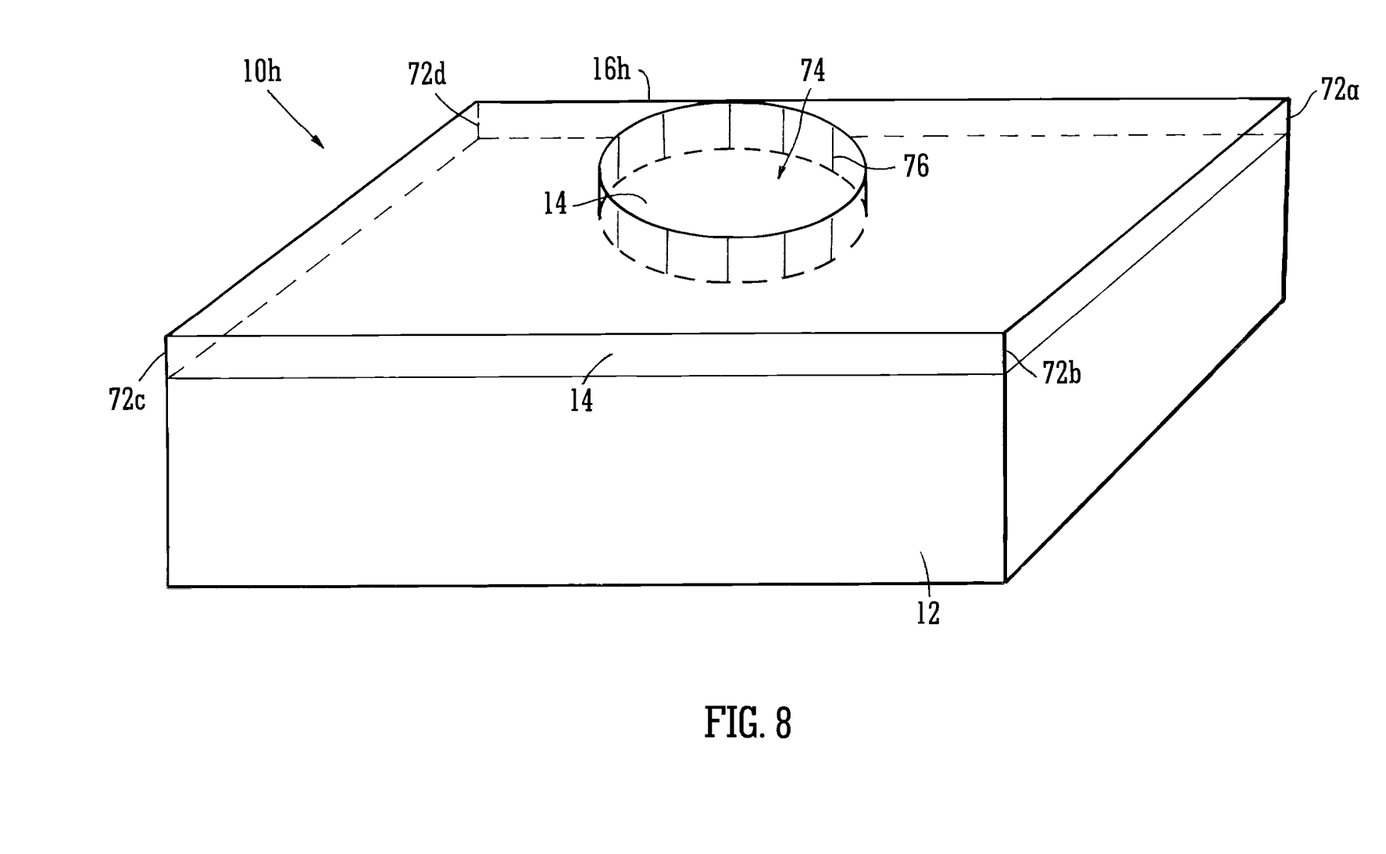
FIG. 8 is a view from the front, one side, and above of another embodiment of the present invention.

Referring to FIG. 8, barrier member 16h is formed from a rectangular planar sheet of netted material arranged to lie above, and in an identical plane to, upper surface 14, and spaced apart therefrom at a distance of approximately 2-3 cm. Barrier member 16h is of identical dimensions to upper surface 14, and is held apart therefrom by vertical support posts 72a-d extending between the respective four corners of barrier member 16h and upper surface 14. Barrier member 16h also includes a centrally disposed circular opening 74, approximately 30-40 cm in diameter, acting as an entrance point for mosquitoes The distance between upper surface 14 and barrier member 16h is maintained in the region of opening 74 by a plurality of vertical support posts 76 extending between the edge of opening 74 and upper surface 14. Only the underside surface of barrier member 16h is impregnated with the non-pyrethroid insecticide.

Figure 9A:
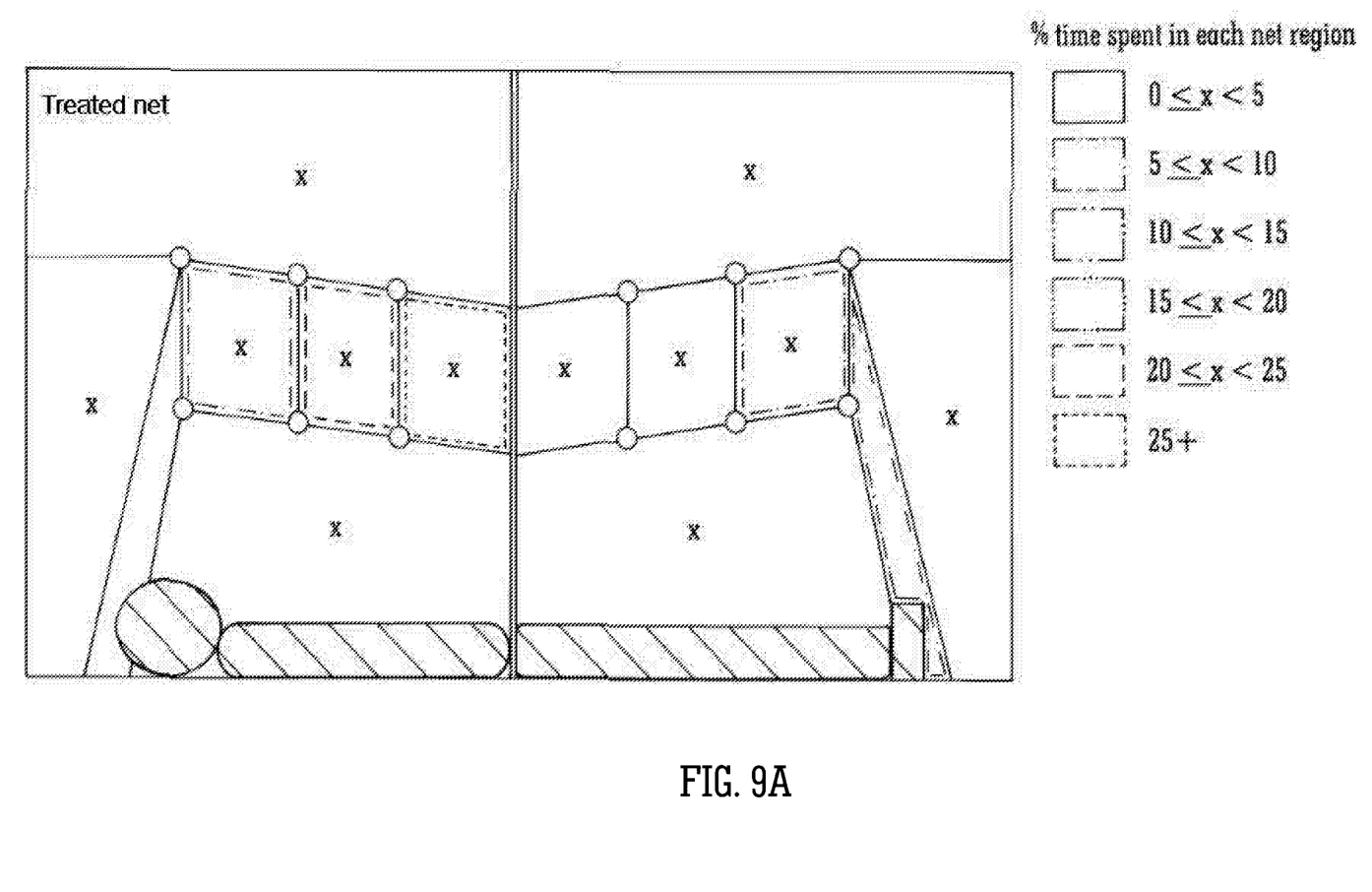
FIGS. 9A-B show examples of the frequency of mosquito-net contacts at various points on both insecticide-treated bed nets and untreated bed nets.
Figure 9B:
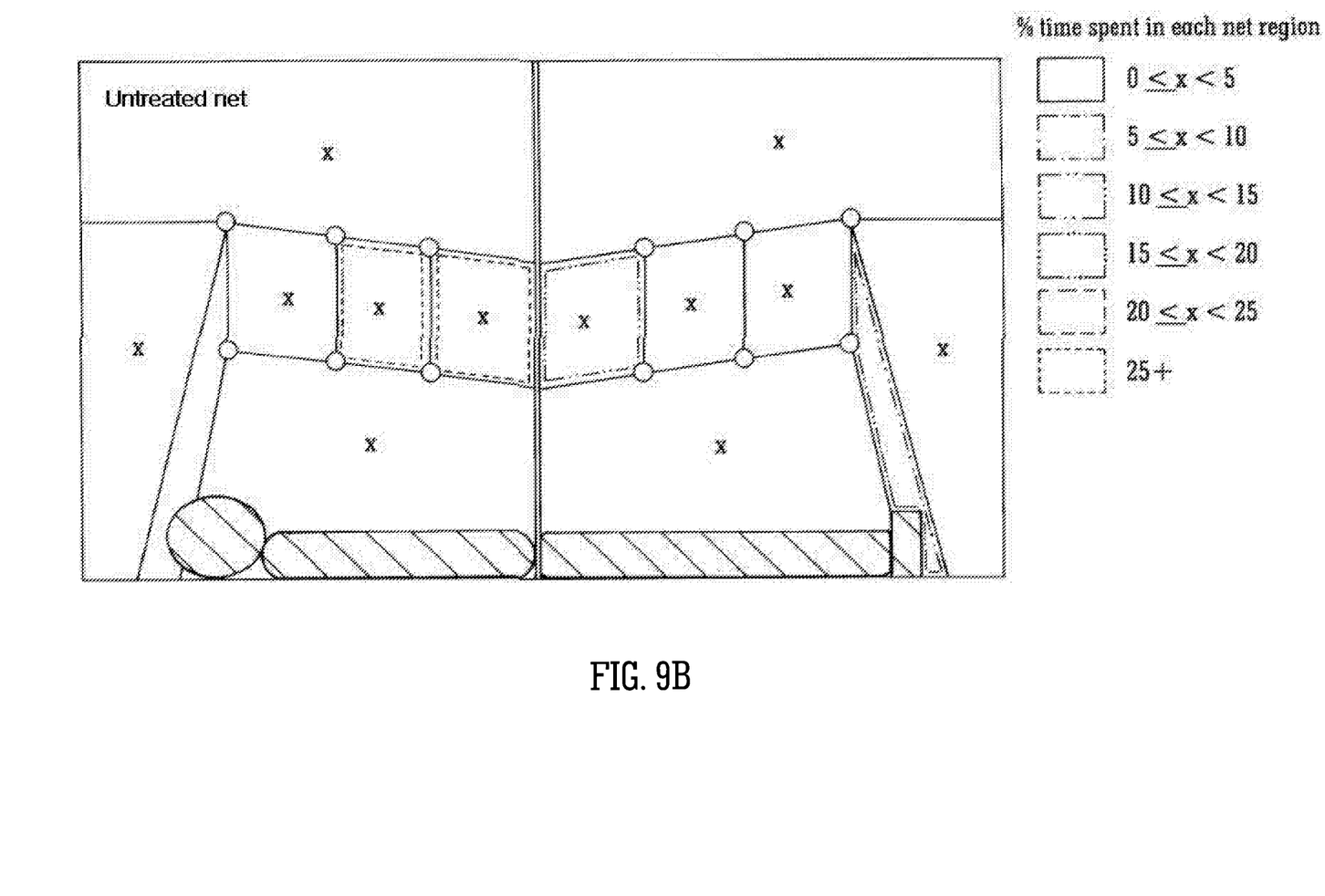

In use, and referring to FIGS. 9A-B, mosquito bed net assembly 10a-h addresses the findings that for human-baited bed nets, the upper portion of the net, particularly the area directly above a prone human, is the area most visited by mosquitoes intent on feeding.

Figure 10:
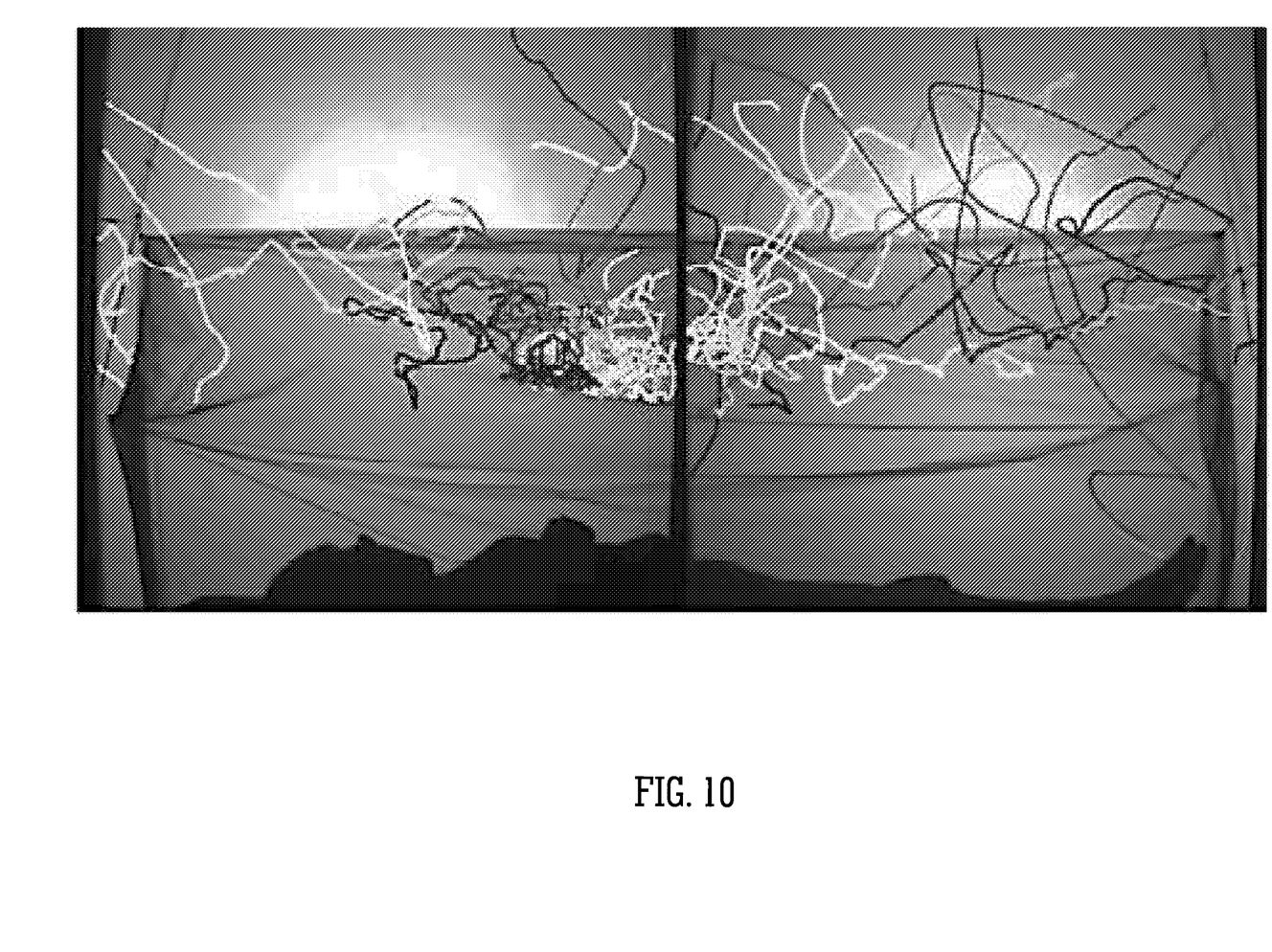
FIG. 10 shows an example of the flight path of multiple mosquitoes over a human-baited bed net.

Referring to FIG. 10, an experiment conducted in total darkness using IR lighting and IR-sensitive cameras demonstrates the flight path of 25 female *Anopheles gambiae* mosquitoes over a standard, human-baited bed bet. FIG. 9 clearly shows a density of mosquito activity on the upper surface of the bed net, particularly in a central portion, with little to no activity occurring at the side walls. FIG. 9 further demonstrates mosquitoes' tendency to adopt oscillating flight paths within this densely populated region. By virtue of barrier member 16, which comprises a non-pyrethroid, and therefore comparatively more potent, insecticide, mosquito bed net assembly 10a-h, in particular bed net assembly 10a-g, provides improved protection against those mosquitoes having a tendency to adopt such oscillating flight paths over the upper surface of the bed net. Barrier member 16 is therefore ideally located to maximize contacts with such mosquitoes and deliver to them a lethal dose of insecticide.

Figure 11:
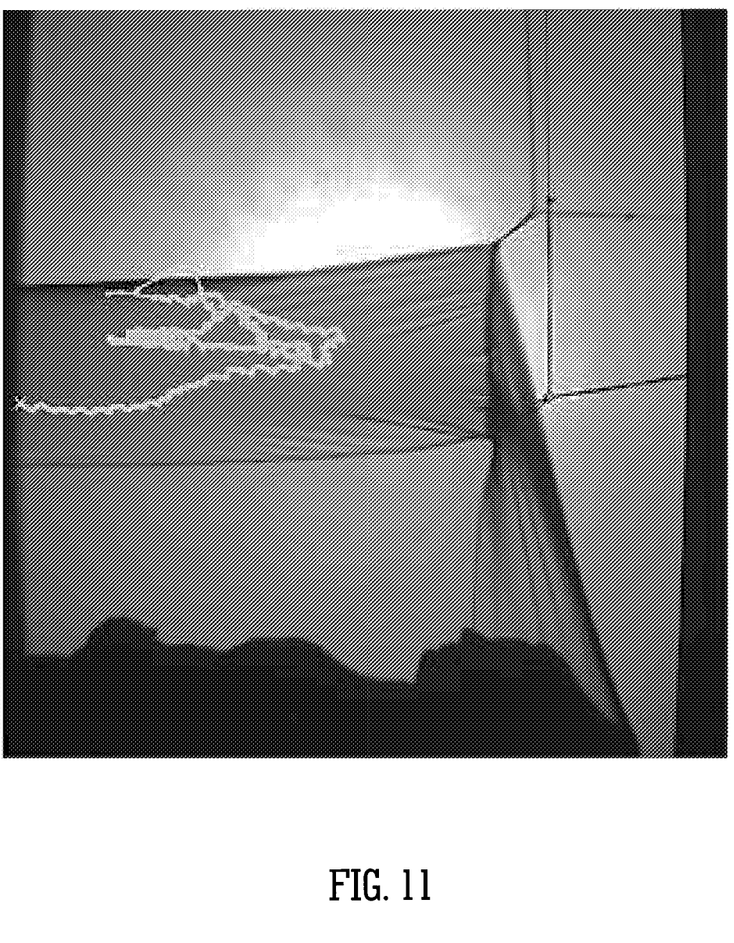
FIG. 11 shows an example of the flight path of a single mosquito over a human-baited bed net.

Referring to FIG. 11, other experiments conducted in total darkness using IR lighting and IR-sensitive cameras demonstrate the tendency of *Anopheles gambiae* mosquitoes to exhibit low-flying trajectories over the upper surface of a standard, human-baited bed net, often making frequent contact with the upper surface. By virtue of barrier member 16, which comprises a non-pyrethroid, and therefore comparatively more potent, insecticide, mosquito bed net assembly 10a-h, in particular bed net assembly 10h, provides improved protection against those mosquitoes having a tendency to adopt these so-called "bouncing" flight trajectories over the upper surface of the bed net. Barrier member 16a-h, in particular barrier member 16h, is therefore ideally located to maximize contacts with such bouncing mosquitoes and deliver to them a lethal dose of insecticide.

The improved mosquito-killing efficacy of bed net assembly 10a-h does not compromise the health of a user, since when using mosquito bed net assembly 10a-h, a user is protected from non-pyrethroid-containing barrier member 16a-h by upper surface 14 of box net 12. Accordingly, bed net assembly 10a-h adheres to the stringent requirements imposed by WHOPES, yet offers markedly improved mosquito killing potential.

After using bed net assembly 10a-h, a user simply removes dead mosquitoes from upper surface 14 by known means, including brushing, blowing or vacuuming.

While specific embodiments of the invention have been described herein for the purpose of reference and illustration, various modifications will be apparent to a person skilled in the art without departing from the scope of the invention as defined by the appended claims. For example, barrier member 16a-h, which has been described as being formed from netted material, may equally be formed from other meshed or webbed fabrics. Whilst barrier member 16a-g has been described as being attached to upper surface 14 via its lower edge, it is equally envisagable that barrier member 16a-g be suspended entirely from a ceiling or other overhead object, without therefore making intimate contact with upper surface 14. Similarly, barrier member 16a,b, which has been described as having portions attachable to a ceiling or other overhead object, may equally comprise one or more rigid support member so as to render it freestanding. Moreover, the positions of barrier member 16a-g on upper surface 14, or its general shape, may vary depending on the flight trajectory tendencies of the surrounding mosquitoes. For example, barrier member 16 may be located in the region approximately one third along the length of upper surface 14, such that it is provided substantially above the chest of a user.

The invention claimed is:

1. A mosquito bed net assembly comprising:
    a mosquito bed net having an upper surface, wherein the upper surface has a plane and the bed net comprises a first insecticide, and
    a barrier member disposed above the upper surface of the bed net,
    wherein the barrier member comprises a second insecticide, and
    wherein the barrier member comprises a first upstanding planar sheet that extends in a vertical plane that is perpendicular to the upper surface of the bed net, and
    at least a portion of the barrier member is attached to the upper surface of the bed net, and
    wherein the barrier member is suitable for intercepting mosquitoes flying above the upper surface of the bed net and delivering to them a dose of the second insecticide.

2. The mosquito bed net assembly of claim 1, wherein the barrier member is a rectangular sheet and the at least a portion of the barrier member is a bottom edge thereof which is attached to the upper surface of the bed net.

3. The mosquito bed net assembly of claim 1, wherein
    a) the bed net has a length and the first planar sheet extends longitudinally along at least a portion of the length of the bed net; or
    b) the bed net has a length and the first planar sheet extends longitudinally along the entire length of the bed net; or
    c) the bed net has a width and the first planar sheet extends laterally along at least a portion of the width of the bed net; or
    d) the bed net has a width and the first planar sheet extends laterally along the entire width of the bed net.

4. The mosquito bed net assembly of claim 3, wherein the first and second insecticides are the same.

5. The mosquito bed net assembly of claim 4, wherein the barrier member is formed from netted, meshed, or webbed fabric.

6. The mosquito bed net assembly of claim 5, wherein the bed net is a box net.

7. The mosquito bed net assembly of claim 6, wherein the barrier member comprises stiffening means.

8. The mosquito bed net assembly of claim 7, wherein the first and second insecticides are selected from the group consisting of allethrin, bifenthrin, cyfluthrin, cypermethrin, cyphenothrin, deltamethrin, esfenvalerate, etofenprox, fenpropathrin, fenvalerate, flucythrinate, flumethrin, imiprothrin, lambda-cyhalothrin, methofluthrin, permethrin, prallethrin, resmethrin, silafluofen, sumithrin, tau-fluvalinate, tefluthrin, tetramethrin, tralomethrin, transfluthrin and pyriproxyfen.

9. The mosquito bed net assembly of claim 7, wherein the barrier member further comprises a second upstanding planar sheet, wherein the second planar sheet intersects and is perpendicular to the first planar sheet.

10. The mosquito bed net assembly of claim 3, wherein the first and second insecticides are different.

11. The mosquito bed net assembly of claim 10, wherein the barrier member is formed from netted, meshed or webbed fabric.

12. The mosquito bed net assembly of claim 11, wherein the bed net is a box net.

13. The mosquito bed net assembly of claim 12, wherein the barrier member comprises stiffening means.

14. The mosquito bed net assembly of claim 13, wherein the first insecticide comprises at least one insecticide selected from the group consisting of allethrin, bifenthrin, cyfluthrin, cypermethrin, cyphenothrin, deltamethrin, esfenvalerate, etofenprox, fenpropathrin, fenvalerate, flucythrinate, flumethrin, imiprothrin, lambda-cyhalothrin, methofluthrin, permethrin, prallethrin, resmethrin, silafluofen, sumithrin, tau-fluvalinate, tefluthrin, tetramethrin, tralomethrin, transfluthrin and pyriproxyfen.

15. The mosquito bed net assembly of claim 14, wherein the first insecticide further comprises a synergist.

16. The mosquito bed net assembly of claim 14, wherein the second insecticide comprises at least one non-pyrethroid insecticide selected from the group consisting of organophosphates, carbamates, pyrroles, hormone mimics and biological insecticides.

17. The mosquito bed net assembly of claim 14, wherein the second insecticide comprises at least one insecticide selected from the group consisting of pirimiphos methyl, propoxur, bendiocarb, indoxycarb, chlorphenapyr, pyriproxyfen, methoprene, *Bacillus thuringiensis israelensis* and entomopathogenic fungi.

18. The mosquito bed net assembly of claim 13, wherein the barrier member further comprises a second upstanding planar sheet, wherein the second planar sheet intersects and is perpendicular to the first planar sheet.

* * * * *